United States Patent [19]

Bea

[11] 4,043,209
[45] Aug. 23, 1977

[54] HYDROSTATIC BEARING LUBRICATION SYSTEM

[76] Inventor: Karl J. Bea, 128 Dewitt St., Syracuse, N.Y. 13203

[21] Appl. No.: 698,837

[22] Filed: June 23, 1976

[51] Int. Cl.² .................... F16H 23/00; F04B 1/14
[52] U.S. Cl. ............................... 74/60; 417/269
[58] Field of Search ........................ 74/60; 417/269

[56] References Cited

U.S. PATENT DOCUMENTS

| 1,842,322 | 1/1932 | Hulsebos | 74/60 |
|---|---|---|---|
| 2,151,415 | 3/1939 | Bennotch | 74/60 |
| 2,380,574 | 7/1945 | Beeh et al. | 417/269 |
| 2,518,618 | 8/1950 | Huber | 417/269 |
| 3,085,514 | 4/1963 | Budzech | 417/269 |

FOREIGN PATENT DOCUMENTS

| 827,441 | 12/1951 | Germany | 74/60 |
|---|---|---|---|
| 96,350 | 6/1937 | Sweden | 74/60 |

*Primary Examiner*—William L. Freeh
*Attorney, Agent, or Firm*—Edward L. Benno

[57] ABSTRACT

A hydrostatic bearing lubrication system for a swash plate compressor or engine in which the compressor or engine has at least one reciprocating piston assembly mounted in a cylinder and connected to and reciprocating with a stator in which a rotating and oscillating rotor is mounted. At least one hydrostatic bearing shoe is mounted within the stator in a bearing relationship with the side of the rotor subject to the highest loads in the operation of the compressor or engine.

In such a compressor or engine the invention comprises means for continuously varying the pressure of the lubricating fluid delivered to the bearing shoe directly with the load on the bearing shoe. That means comprises a closed cylinder with a free piston carried therein. One end of the closed cylinder on one side of the free piston is interposed in the lubricating fluid pressure line from a constant pressure lubricating fluid pump to the bearing shoe. The other end of the closed cylinder on the other side of the free piston is connected by a fluid pressure line into the head end of the compressor or engine cylinder so that as pressure in the compressor or engine cylinder varies, that pressure is directly applied to the free piston which in turn directly correspondingly varies the lubricating fluid pressure in the lubricating fluid flowing to the bearing shoe. Check valves prevent reverse flow in the system when a negative pressure is produced in the compressor or engine cylinder. In a preferred embodiment, the closed cylinder is formed in the piston rod of the piston assembly of the compressor or engine.

9 Claims, 1 Drawing Figure

HYDROSTATIC BEARING LUBRICATION SYSTEM

BACKGROUND OF THE INVENTION

In the known uses of thrust bearings which are formed as hydrostatic bearings, means are provided for delivering a lubricating fluid under pressure to the bearings to ensure adequate lubrication of the relatively rotating parts under the thrust loads that the parts must absorb. Most commonly, a constant pressure pump is used to deliver lubricating fluid to the bearings. Such an arrangement has not been adequate for devices where the load on the bearings is not substantially constant. In those situations, machine speed or bearing position responsive means have been developed for increasing the pressure of the lubricating fluid delivered to the bearings. However, those arrangements are not suitable for use with a machine such as a swash plate compressor where the load on the bearings greatly changes with each rotation of the machine and with the varied load or power demands on such a machine when the degree of oscillation of the swash plate may be constantly varied.

SUMMARY OF THE INVENTION

The subject invention provides a lubrication system for a machine such as a swash plate compressor or comparably constructed engine in which the machine has a number of reciprocating cylinder and piston assemblies connected to a stator which reciprocates or oscillates with the reciprocation of the pistons in their cylinders, and in which a rotor is mounted within the stator. The rotor is constructed to both rotate within and oscillate with the stator. In such machines arranged as compressors, input power rotates the rotor which, by virtue of being disposed at an angle other than perpendicular to its axis of rotation, in rotating causes the stator to oscillate to in turn cause the compressor pistons to reciprocate to compress some fluid as the output power of the machine. Hydrostatic bearings are suitable for such a machine if lubricating fluid under pressures adequate to provide a lubricating fluid film between the bearing shoes and the rotor is delivered to the bearing shoes under all anticipated loading conditions. It is not sufficient to merely consider the cyclical loading occuring in each rotation of such a machine if the angle of oscillation of the rotor is constantly varied to constantly vary the compressor output, such as in the wind driven compressor of my pending U.S. Pat. application Ser. No. 571,395. The present invention solves the problem of adequate lubrication in such machines of constantly and greatly varying load conditions by regulating the lubricating fluid pressure directly with the load on the hydrostatic bearing shoes. This is accomplished by interposing a lubricating fluid reservoir in the lubricating fluid line from a constant pressure pump to the bearing shoes and by varying the fluid pressure in the reservoir directly with the pressure in the associated compressor cylinder. Check valves associated with the reservoir prevent fluid pressure increases in the reservoir from being applied against the pump outlet and prevent fluid pressure in the reservoir from drawing fluid back from the bearing shoes to the reservoir.

In a preferred embodiment of the invention a reservoir is formed in the piston rod of each of the piston and cylinder assemblies of a multiple piston and cylinder arrangement in a swash plate compressor.

The primary object of the present invention is to provide a hydrostatic bearing lubrication system for a swash plate compressor or comparably constructed engine in which lubrication pressures will be constantly directly varied as the loading on the bearings constantly varies.

Other objects and features of the invention will be apparent upon a perusal of the detailed description read in conjunction with the drawing.

IN THE DRAWING

FIG. 1 is a cross sectional view, partially diagrammatic, of a swash plate compressor constructed according to one embodiment of the invention.

DETAILED DESCRIPTION OF A PREFERRED EMBODIMENT

Figure 1:
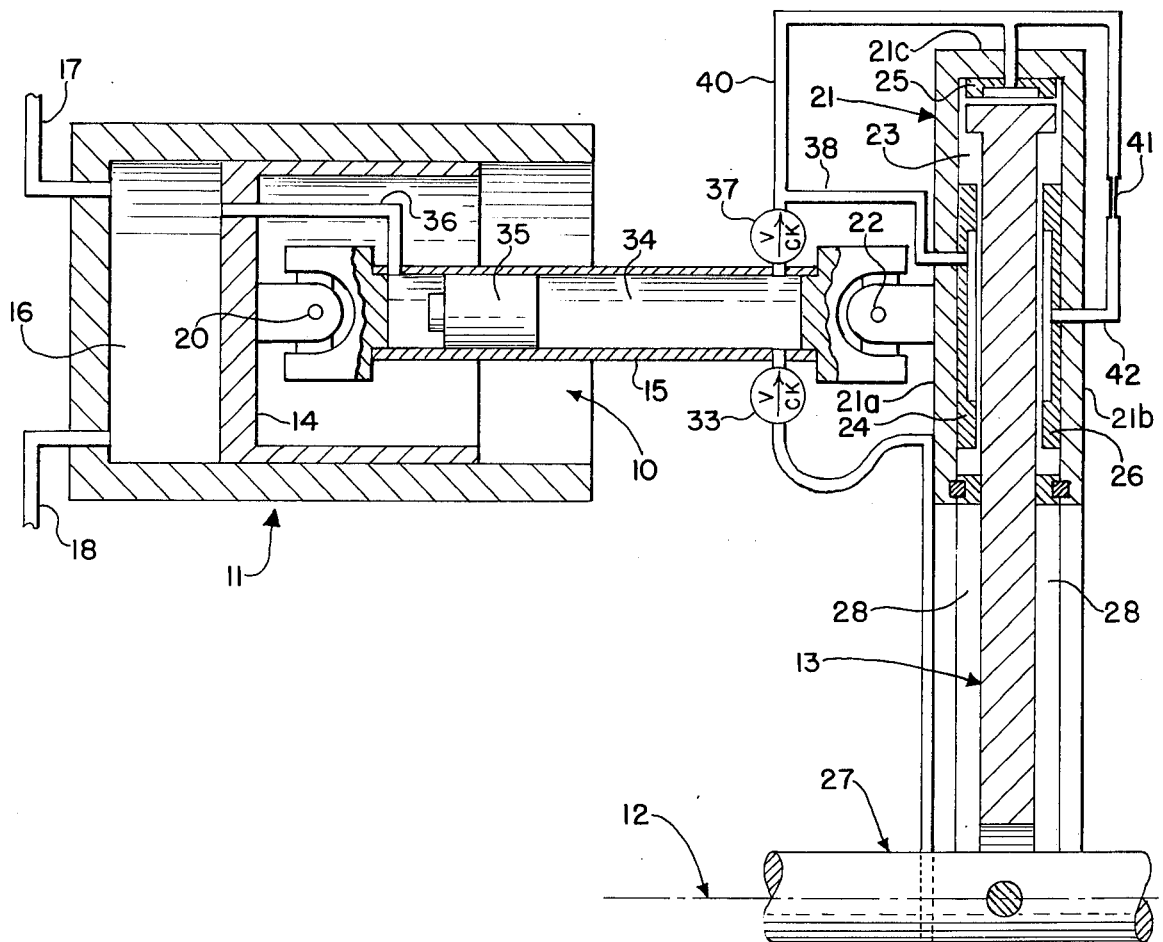

Although many of the details of the swash plate compressor shown in the drawing are omitted or only diagrammatically shown, those skilled in the art will readily understand the invention from the hereinafter following description read with the drawing. Those skilled in the art will further understand that the subject invention can be applied to different known forms of swash plate compressors or comparable engine constructions.

The swash plate compressor shown comprises at least one piston assembly 10 reciprocatingly mounted within a cylinder assembly 11. Conventionally a plurality of such piston and cylinder assemblies are fixedly mounted in a housing and disposed in a circle about the axis of rotation 12 of the rotor 13.

The piston assembly 10 comprises a piston head 14 and a piston rod 15. Known piston rings may be provided about the piston head 14 to substantially seal the area about the piston head 14 and adjacent to the inner wall of the cylinder assembly 11 as the piston head 14 is caused to reciprocate within the cylinder assembly 11. The piston head 14 cooperates with the head end of the cylinder assembly 11 to provide a fluid compressing chamber 16. As the piston assembly 10 is caused to longitudinally reciprocate within the cylinder assembly 11, a fluid is drawn into chamber 16 through inlet conduit 17, compressed and expelled through outlet conduit 18. Suitable known valving (not shown) controls the direction fluid may pass through the conduits 17 and 18 in the operation of the compressor.

One end of the piston rod 15 is pivotally connected to the piston head 14 by a universal joint 20. The other end of the piston rod 15 is pivotally connected to the stator 21 by a universal joint 22.

The stator 21 is formed as an annular member, one half thereof being shown in the drawing. A chamber 23 for the radially outward portions of the rotor 13 and for the hydrostatic bearing shoes 24, 25 and 26 is provided by the side walls 21a and 21b and end wall 21c of the stator 21. Although the walls 21a, 21b and 21c of the stator 21 are shown as integrally formed it should be understood that those walls may be separately formed and secured together as shown.

The stator 21 is mounted in the compressor by known means (not shown) which will hold the stator 21 against rotation about the axis 12 but will permit the stator 21 to oscillate in directions parallel to the axis 12. Obviously, as one circumferential section of the stator 21 moves toward a cylinder 11, the circumferential section diametrically opposite thereto will be moving away from its associated cylinder 11. As is known in the art of swash plate compressors that action or movement of the stator 21 is caused by the nutation of the rotor 13 as it is rotated by its drive shaft. As shown in the drawing, the rotor 13 is rotated by a shaft assembly 27. As shown in the drawing the rotor 13 is perpendicular to the axis 12 of its drive shaft assembly 27 and in that condition no oscillation of the stator 21 will occur upon rotation of the rotor 13. However, as is well known in the art of swash plate compressors, means (not shown) are provided for disposing the rotor 13 at angles other than a 90° angle to its axis of rotation to produce nutation of the rotor as it is rotated. Further, as described in my noted pending application, means may be provided in a swash plate compressor for constantly varying the angle of the rotor to its axis of rotation.

With a circle of piston 10 and cylinder assemblies 11 connected to stator 21, rotation of the rotor drive shaft assembly 27, with the rotor disposed at an angle of other than 90° to its axis of rotation, will cause the rotor 13 to rotate and oscillate, and the oscillations of the rotor 13 will through the stator 21 cause oscillation of each of the piston 10 and cylinder assemblies 11 in a continuous serially cyclical manner.

The rotor 13 is formed as a disk with a peripheral flange. The rotor 13 is shown in the drawing in a cross section taken diametrically therethrough. The outer peripheral portion of the rotor 13 rotates within the annular chamber 23 of the stator 21 and a pair of annular seals 28 mounted between the rotor faces and the walls 21b and 21b of the stator 21 seal the chamber 23 against the leakage of any substantial amounts of lubricating fluid therefrom.

The hydrostatic bearing shoes 24, 25 and 26 are mounted within the annular chamber 23 and are respectively secured to the walls 21a, 21c and 21b of the stator 21. Each of the bearing shoes 24 and 26 is preferably circular in its peripheral configuration and is further shaped as a shallow cup with the concave side of the cup against one face of the rotor 13. Each of the bearing shoes 25 may also be circular or oblong in peripheral configuration and is also further shaped as a shallow cup with its concave side against the radially outward edge of the rotor 13. One bearing shoe 24, 25 and 26 is provided for each piston 10 and cylinder 11 assembly. The bearing shoes 24, 25 and 26 are shown in the drawing viewed from a diametrical cross section. As shown in the upper portion of the drawing, the centers of the bearing shoes 24 and 26 lie on the longitudinal axis of the piston rod 15 with the bearing shoe 24 between the rotor 13 and the wall 21a of the rotor 21, and with the bearing shoe 26 on the other side of the rotor 21. The center of the bearing shoe 25 lies on a radial line of the rotor 13 intersecting the longitudinal axis of the piston rod 15. A comparable arrangement for the bearing shoes 24, 25 and 26 in the lower portion of the drawing is also provided, but the piston 10 and cylinder 11 assembly for those bearing shoes has been omitted.

Since the described embodiment of the invention is a fluid compressor, the bearing shoes 24 are subject to the highest loading in the operation of the compressor when a fluid is being compressed in the chamber 16 in the head end of the cylinder 11. Bearing shoes 26 will experience the least loading as the piston 10 is drawn outwardly of the cylinder 11.

The lubrication system for the compressor comprises a constant pressure pump 30 shown diagrammatically. Cooling means are preferably associated with the pump 30 to also provide for a substantially constant temperature of the lubricating fluid delivered to the bearing shoes. One end of a fluid conduit 31 is connected into the chamber 23 at lower portion of the stator 21. That lower portion of the stator 21 serves as a sump for the lubricating fluid draining from between all of the bearing shoes 24, 25 and 26 and the rotor 13 in the operation of the lubricating system. The other end of the conduit 31 is connected to the inlet port of the pump 30. The outlet port of the pump 30 is connected by a conduit 32 to a check valve 33 mounted on each of the piston rods 15 of the compressor. The portion of the conduit 32 adjacent the check valve 33 is arranged to be moveable with any pivoting of the piston rod 15.

The piston rod 15 is internally formed as a cylindrical chamber 34 closed at both ends. A free piston 35 is reciprocatingly carried in the chamber 34.

The check valve 33 is connected into the end of the chamber 34 adjacent the universal joint 22, and the check valve 33 operates to prevent lubricating fluid flow from chamber 34 into conduit 32 while permitting free fluid flow in the opposite direction.

The other end of the chamber 34 on the other side of the free piston 35 is connected by a conduit or fluid pressure line 36 through the piston head 14 into the chamber 16.

A second check valve 37 is connected into the chamber 34 at the same end thereof as the check valve 33. The check valve 37 permits free fluid flow from the chamber 34 but prevents any flow in the opposite direction. A pair of conduits 38 and 40 are connected in parallel to the check valve 37. The other end of conduit 38 is connected through the stator wall 21a into the concave recess of the bearing shoe 24. The other end of conduit 40 is connected in parallel to a fluid flow restrictor 41 and through the wall 21c of the stator 21 into the concave recess of the bearing shoe 25. The other side of the flow restrictor 41 is connected by a conduit 42 through the wall 21b of the stator 21 into the concave recess of the bearing shoe 26.

In operation, lubricating fluid from the pump 30 fills the chambers 34 of the piston rods of all of the piston 10 and cylinder 11 assemblies of the compressor and also all of the conduits 31, 32, 38, 40 and 42. As the stator 21 oscillates and moves any piston rods 15 to compress fluid in chamber 16 of the associated cylinders 11, the fluid pressure in chambers 16 acting through pressure lines 36 and into chambers 34 causes the pistons 35 to apply a corresponding pressure on the lubricating fluid in the chambers 34. That increased lubricating fluid pressure will be applied through conduits 38 and 40 to the bearing shoe recesses to increase the fluid pressure of the lubricating fluid in those bearing shoes. Thus it may be seen that the higher the fluid pressure in any chamber 16 and consequently the loading on the associated bearing shoes 24 and 25, and particularly bearing shoe 24, the higher will be the pressure of the lubricating fluid in the associated bearing shoes 24 and 25.

Due to the flow restrictor 41, and the pressure drop thereacross, a minimum pressure increase is applied to the bearing shoe 26.

When the stator 21 oscillates to draw a piston assembly 10 from its associated cylinder 11, the free piston 35 will move toward the head end of the cylinder 11 as fluid pressure from the pump 30 exceeds pressure on the piston 35 from the cylinder chamber 16.

From the foregoing it may be seen that as the load on any bearing shoe is increased the lubricating fluid pressure to that bearing shoe will be correspondingly increased to ensure that an adequate lubrication fluid film will be provided between any bearing shoe and the rotor under all varying loading conditions.

Having described the invention it will be understood that changes can be made in the described embodiment by those skilled in the art within the spirit and scope of the hereinafter following claims.

I claim:

1. A hydrostatic bearing lubrication system for a swash plate compressor or engine in which the compressor or engine has a piston reciprocating in a cylinder with the piston connected to and reciprocating with a stator in which a rotating and oscillating rotor is mounted and with a hydrostatic bearing shoe mounted to the stator and between the stator and rotor at a position subject to continuously variable pressure loading of the piston and the stator on the rotor, said system comprising a lubricating fluid reservoir, a pump connected to deliver a lubricating fluid under substantially constant pressure to said reservoir, pressure means operating responsive to pressures within said cylinder to directly apply substantially corresponding pressures to said reservoir, conduit means connected between said reservoir and said bearing shoe to deliver lubricating fluid under pressure between said bearing shoe and said rotor, and means for returning lubricating fluid draining from between said bearing shoe and said rotor to said pump.

2. A hydrostatic bearing lubrication system for a swash plate compressor or engine in which the compressor or engine has a first piston reciprocating in a first cylinder with the first piston connected to and reciprocating with a stator in which a rotating and oscillating rotor is mounted and with a hydrostatic bearing shoe mounted to the stator and between the stator and rotor at a position subject to continuously variable pressure loading of the first piston and the stator on the rotor, said system comprising a load cylinder having a free piston slidably carried therein intermediate the ends thereof, a fluid pressure line connected between the head end of said first cylinder and one end of said load cylinder, a first lubricating fluid conduit connected between the other end of said load cylinder and said bearing shoe for delivering a lubricating fluid from said other end of said load cylinder to the side of said bearing shoe adjacent said rotor, a check valve in said first conduit arranged to prevent lubricating fluid flow from said bearing shoe to said other end of said load cylinder, a lubricating fluid sump connected to collect lubricating fluid draining from between said bearing shoe and said rotor, a substantially constant pressure pump having an inlet port connected to said sump to receive lubricating fluid therefrom and an outlet port, a second lubricating fluid conduit connected between said outlet port of said pump and said other end of said load cylinder, and a check valve in said second conduit arranged to prevent lubricating fluid flow from said other end of said load cylinder to said pump.

3. A hydrostatic bearing lubrication system for a swash plte compressor having at least one compressor piston reciprocating in a compressor cylinder with the piston connected to and reciprocating with a stator in which a rotating and oscillating rotor is mounted and with a hydrostatic bearing shoe mounted in said stator on the side connected to said piston and bearing against said rotor, said system comprising a lubricating fluid reservoir, a substantially constant pressure pump connected to deliver a lubricating fluid to said reservoir, check valve means connected to prevent lubricating fluid flow directly from said reservoir to said pump, pressure means operating responsive to pressures within the head end of said compressor cylinder to directly apply substantially corresponding pressures to said reservoir, conduit means connected between said reservoir and said bearing shoe to deliver lubricating fluid under pressure from said reservoir to said bearing shoe between said bearing shoe and said rotor, and means for returning lubricating fluid draining from between said bearing shoe and said rotor to said pump.

4. In a hydrostatic bearing lubrication system as defined in claim 3, said reservoir comprising a closed cylinder, one end of said closed cylinder being connected to said conduit means and to receive lubricating fluid from said pump, said pressure means comprising a free piston reciprocatingly mounted within said closed cylinder intermediate the ends thereof and a fluid pressure line connected between the head end of said compressor cylinder and the other end of said closed cylinder.

5. In a hydrostatic bearing lubrication system as defined in claim 4 wherein said at least one compressor piston comprisies a piston head and a piston rod, said closed cylinder of said reservoir being formed within and aligned longitudinally of said piston rod, and said fluid pressure line being connected through said piston head to the head end of compressor cylinder.

6. In a hydrostatic bearing lubrication system as defined in claim 3, and second check valve means connected in said conduit means to prevent lubricating fluid flow from said bearing shoe to said reservoir.

7. In a hydrostatic bearing lubrication system as defined in claim 6 wherein said stator includes at least one second bearing shoe mounted therein and bearing against the radially outward edge of said rotor, and second conduit means connected between said reservoir and said second bearing shoe to deliver lubricating fluid under pressure from said reservoir to said second bearing shoe between said second bearing shoe and the radially outward edge of said rotor, and said means for returning lubricating fluid to said pump includes returning lubricating fluid draining from between said second bearing shoe and said rotor to said pump.

8. In a hydrostatic bearing lubrication system as defined in claim 7, wherein said means for returning lubricating fluid draining from between said bearing shoes and said rotor comprises a sump formed in said stator to collect lubricating fluid draining from between said bearing shoes and said rotor, and a drain conduit connected between said sump and the inlet of said pump.

9. In a hydrostatic bearing lubrication system as defined in claim 8 wherein said stator includes at least one third bearing shoe mounted therein and bearing against said rotor on the side opposite from said first bearing shoe, third conduit means connected between said reservoir and said third bearing shoe to deliver lubricating fluid under pressure from said reservoir to said third bearing shoe between said third bearing shoe and said rotor, and a lubricating fluid flow restrictor mounted in said third conduit means and operating to produce a substantial drop in the fluid pressure of the lubricating fluid flowing to said third bearing shoe.

* * * * *